US012291027B2

(12) United States Patent
Yamada

(10) Patent No.: US 12,291,027 B2
(45) Date of Patent: May 6, 2025

(54) LIQUID DISCHARGING APPARATUS

(71) Applicant: SEIKO EPSON CORPORATION, Tokyo (JP)

(72) Inventor: Shinichi Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 252 days.

(21) Appl. No.: 18/192,289

(22) Filed: Mar. 29, 2023

(65) Prior Publication Data

US 2023/0311489 A1 Oct. 5, 2023

(30) Foreign Application Priority Data

Mar. 31, 2022 (JP) ................................ 2022-058554

(51) Int. Cl.
*B41J 2/045* (2006.01)
*B41J 2/14* (2006.01)

(52) U.S. Cl.
CPC ......... *B41J 2/0455* (2013.01); *B41J 2/04541* (2013.01); *B41J 2/04551* (2013.01); *B41J 2/04581* (2013.01); *B41J 2/14201* (2013.01); *B41J 2002/14483* (2013.01); *B41J 2002/14491* (2013.01)

(58) Field of Classification Search
CPC ............................ B41J 2/0455; B41J 2/04533
See application file for complete search history.

(56) References Cited

U.S. PATENT DOCUMENTS

| | | | | |
|---|---|---|---|---|
| 11,104,128 | B2 * | 8/2021 | Fukuzawa | B41J 2/0459 |
| 2005/0088490 | A1 * | 4/2005 | Mita | B41J 2/14233 347/68 |
| 2018/0056648 | A1 * | 3/2018 | Lahiri | B41J 2/04541 |
| 2018/0201019 | A1 * | 7/2018 | Seto | B41J 2/04526 |
| 2019/0291420 | A1 * | 9/2019 | Hara | B41J 2/04588 |
| 2020/0207083 | A1 * | 7/2020 | Ozawa | B41J 2/04588 |
| 2020/0238704 | A1 * | 7/2020 | Koide | B41J 2/04588 |
| 2021/0237442 | A1 | 8/2021 | Naganuma et al. | |

FOREIGN PATENT DOCUMENTS

JP 2021-119042 A 8/2021

* cited by examiner

*Primary Examiner* — Shelby L Fidler
(74) *Attorney, Agent, or Firm* — Global IP Counselors, LLP

(57) ABSTRACT

A liquid discharging apparatus has: a discharging section that discharges a liquid when at least one of a first piezoelectric element and a second piezoelectric element is driven; In a first mode in which the driving signal is output from the second output portion, the switch control circuit controls the first switch so as not to create a continuity and controls the second switch so as to create a continuity. In a second mode in which the constant-voltage signal is output from the second output portion, the switch control circuit controls the first switch so as to create a continuity and controls the second switch so as not to create a continuity.

5 Claims, 8 Drawing Sheets

FIG. 8
| [LtaS,LtbS] (SOd) | | [1,1] (SOd=1) | [0,0] (SOd=0) |
|---|---|---|---|
| Sc | T1 | H | L |
| | T2 | H | L |
FIG. 9
| [Lta(Ltb)] (SId) | | [1] (SId=1) | [0] (SId=0) |
|---|---|---|---|
| S | T1 | H | L |
| | T2 | L | H |
FIG. 10
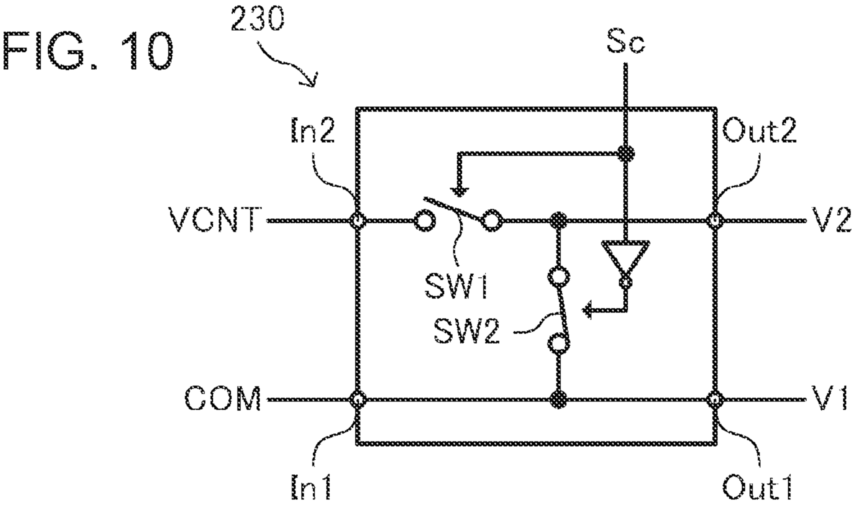
FIG. 11
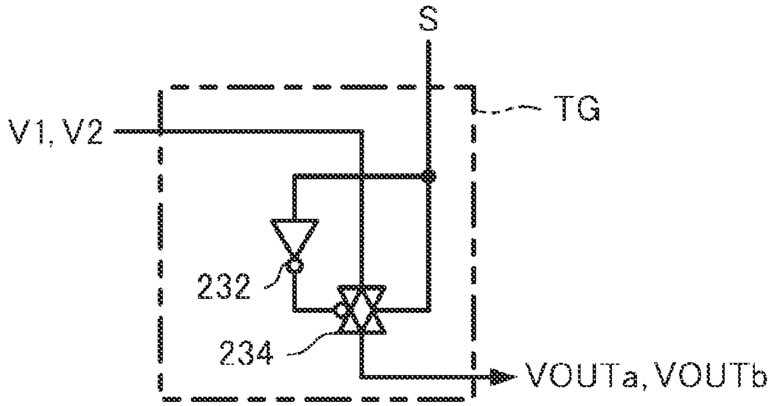

LIQUID DISCHARGING APPARATUS

The present application is based on, and claims priority from JP Application Serial Number 2022-058554, filed Mar. 31, 2022, the disclosure of which is hereby incorporated by reference herein in its entirety.

BACKGROUND

1. Technical Field

The present disclosure relates to a liquid discharging apparatus.

2. Related Art

Known liquid discharging apparatuses that discharge a liquid to a medium are structured so that a driving element is driven in response to a driving signal to change internal pressure in a cavity filled with the liquid and then to discharge the liquid due to the change in the internal pressure. Some of these known liquid discharging apparatuses that discharge a liquid by driving a driving element to change internal pressing in a cavity are designed to discharge a highly viscous liquid or have a function for circulating the liquid supplied to the discharge head. To stably discharge a liquid, a known liquid discharging apparatus of this type has a plurality of driving elements for a single nozzle from which the liquid is discharged; when the plurality of driving elements are driven, the liquid is discharged.

JP-A-2021-119042, for example, discloses a liquid discharging apparatus that has a plurality of driving elements for a single nozzle from which a liquid is discharged.

From the viewpoint of stably discharging ink and reducing power consumption, however, the liquid discharging apparatus described in JP-A-2021-119042 was susceptible to improvement.

SUMMARY

A liquid discharging apparatus according to an aspect of the present disclosure has:

- a discharging section including a first piezoelectric element and a second piezoelectric element, the discharging section discharging a liquid when at least one of the first piezoelectric element and the second piezoelectric element is driven;
- a driving signal output circuit that outputs a driving signal that drives at least one of the first piezoelectric element and the second piezoelectric element;
- a constant-voltage output circuit that outputs a constant-voltage signal, the voltage value of which is constant;
- a path switching circuit having a first input portion into which the driving signal is entered, a second input portion into which the constant-voltage signal is entered, a first output portion that outputs the driving signal, a second output portion that outputs the driving signal or the constant-voltage signal, a first switch, one end of which is coupled to the second input portion and the other end of which is coupled to the second output portion, and a second switch, one end of which is coupled to the first output portion and the other end of which is coupled to the second output portion;
- first wiring through which the first output portion and the first piezoelectric element are electrically coupled together;
- second wiring through which the second output portion and the second piezoelectric element are electrically coupled together; and
- a switch control circuit that controls the first switch and the second switch.

In a first mode in which the driving signal is output from the second output portion, the switch control circuit controls the first switch so as not to create a continuity and controls the second switch so as to create a continuity.

In a second mode in which the constant-voltage signal is output from the second output portion, the switch control circuit controls the first switch so as to create a continuity and controls the second switch so as not to create a continuity.

BRIEF DESCRIPTION OF THE DRAWINGS

FIG. 8 illustrates an example of decoding by a decoder.

FIG. 9 illustrates an example of decoding by other decoders.

FIG. 10 illustrates an example of a path switching circuit.

FIG. 11 illustrates an example of the structure of a selection circuit.

DESCRIPTION OF EXEMPLARY EMBODIMENTS

A preferred embodiment of the present disclosure will be described below with reference to the drawings. These drawings will be referenced for convenience of explanation. The embodiment described below does not unreasonably restrict the contents of the present disclosure, the contents being described in the scope of claims. All of the structures described below are not always essential structural requirements in the present disclosure.

1. Outline of a Liquid Discharging Apparatus

Figure 1:
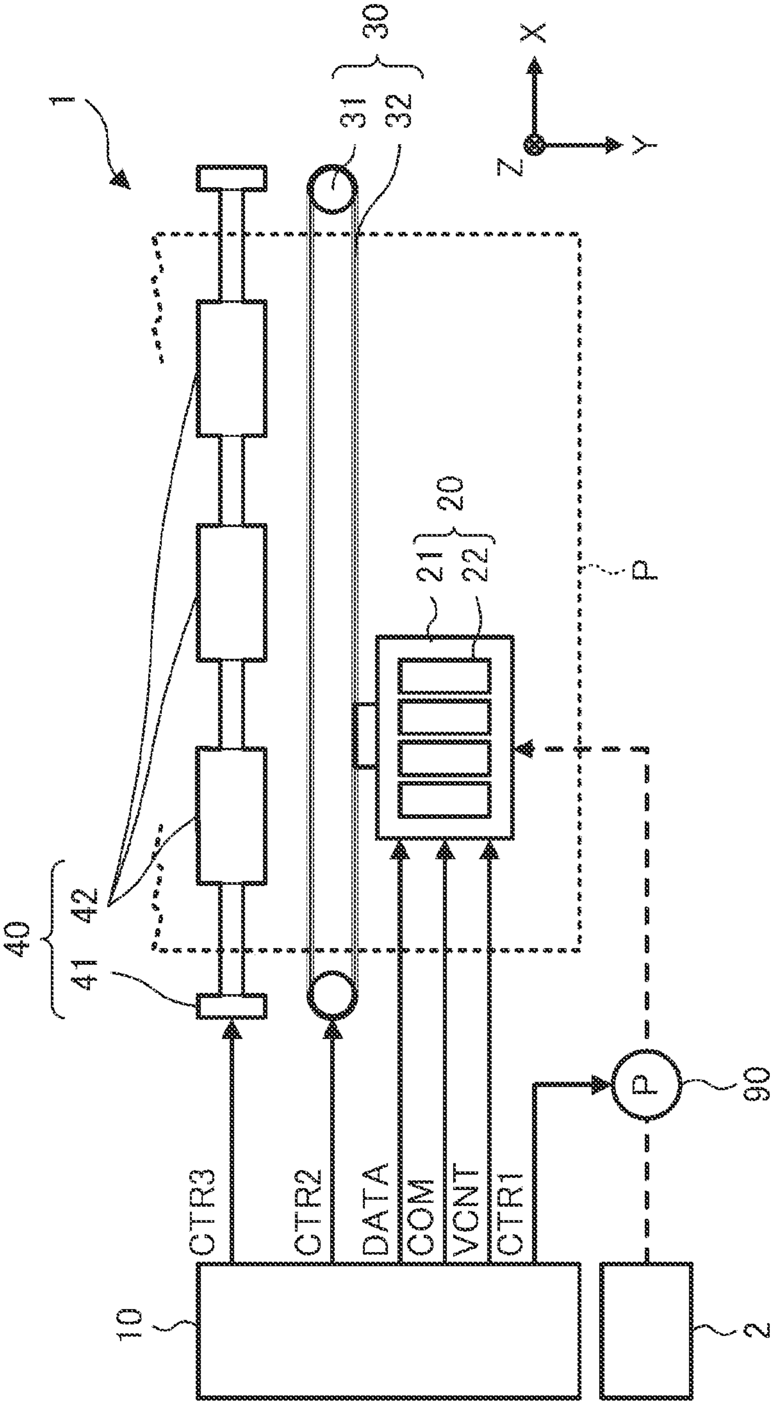
FIG. 1 schematically illustrates the structure of a liquid discharging apparatus.

FIG. 1 schematically illustrates the structure of a liquid discharging apparatus 1. The liquid discharging apparatus 1 in this embodiment is a serial printing type of ink jet printer that forms a desired image on a medium P by bidirectionally moving a carriage 21, in which liquid discharge heads 22 that discharge ink, which is as an example of a liquid, are mounted, and causing the liquid discharge heads 22 to discharge ink to the medium P to be transported. In the description below, a direction in which the carriage 21 moves will be taken as the X direction, a direction in which the medium P is transported will be taken as the Y direction, and a direction in which ink is discharged will be taken as the Z direction. Although the X direction, Y direction, and Z direction will be assumed to be mutually orthogonal, this does not restrict constituent elements included in the liquid discharging apparatus 1 to placement in which they are orthogonally provided.

In the description below, a direction along the X direction in which the carriage 21, in which the liquid discharge heads 22 are mounted, bidirectionally move will also be referred to as the main scanning direction; a direction along the Y direction in which the medium P is transported will also be referred to as the transport direction; and a direction along the Z direction in which the liquid discharge heads 22 discharge ink will also be referred to as the discharge direction. In the description below, the same side as the starting point of the arrow indicating the X direction will also be referred to as the −X-direction side; and the same side as the top of the arrow will also be referred to as the +X-direction side; the same side as the starting point of the arrow indicating the Y direction will also be referred to as the −Y-direction side, and the same side as the top of the arrow will also be referred to as the +Y-direction side; and the same side as the starting point of the arrow indicating the Z direction will also be referred to as the −Z-direction side, and the same side as the top of the arrow will also be referred to as the +Z-direction side.

As illustrated in FIG. 1, the liquid discharging apparatus 1 has an ink tank 2, a control unit 10, a head unit 20, a moving unit 30, a transport unit 40, and a circulation mechanism 90.

A plurality of types of ink to be discharged to the medium P are held in the ink tank 2. Colors of ink held in the ink tank 2 include black, cyan, magenta, yellow, red, gray, and the like. Examples of the ink tank 2 in which these types of ink are held include an ink cartridge, a bag-shaped ink pack formed from a flexible film, an ink tank that can be replenished with ink, and the like.

The circulation mechanism 90 supplies ink held in the ink tank 2 to the liquid discharge head 22 in response to a control signal CTRL output from the control unit 10. The circulation mechanism 90 also collects ink held in ejection flow paths formed in the liquid discharge head 22 in response to the control signal CTRL output from the control unit 10. That is, the circulation mechanism 90 causes ink to flow back in the liquid discharging apparatus 1.

The control unit 10 includes, for example, a processing circuit such as a central processing unit (CPU) or a field programmable gate array (FPGA) as well as a storage circuit such as a semiconductor memory. The control unit 10 controls elements included in the liquid discharging apparatus 1.

The head unit 20 includes the carriage 21 and liquid discharge heads 22. The liquid discharge heads 22 are mounted in the carriage 21. The carriage 21 is fixed to an endless belt 32 included in the moving unit 30, which will be described later. Each liquid discharge head 22 accepts, from the control unit 10, discharge data signals DATA, which control discharging of ink, a driving signal COM, which drives the liquid discharge head 22 so that ink is discharged from it, and a constant-voltage signal VCNT having a constant voltage value. The liquid discharge head 22 discharges, to the medium P, ink supplied from the ink tank 2 through the circulation mechanism 90, in response to the discharge data signals DATA and driving signal COM.

The moving unit 30 includes a carriage motor 31 and the endless belt 32. The carriage motor 31 operates in response to a control signal CTR2 entered from the control unit 10. The endless belt 32 rotates according to the operation of the carriage motor 31. Thus, the carriage 21 fixed to the endless belt 32 bidirectionally moves along the X direction.

The transport unit 40 includes a transport motor 41 and a transport roller 42. The transport motor 41 operates in response to a control signal CTR3 entered from the control unit 10. The transport roller 42 rotates according to the operation of the transport motor 41. The medium P is transported along the Y direction due to the rotation of the transport roller 42.

As described above, in the liquid discharging apparatus 1, ink is discharged from the liquid discharge head 22 mounted in the carriage 21 in response to the transport of the medium P by the transport unit 40 and to the bidirectional movement of the carriage 21 by the moving unit 30, so ink lands on predetermined positions on a surface of the medium P, forming a desired image on the medium P.

Figure 2:
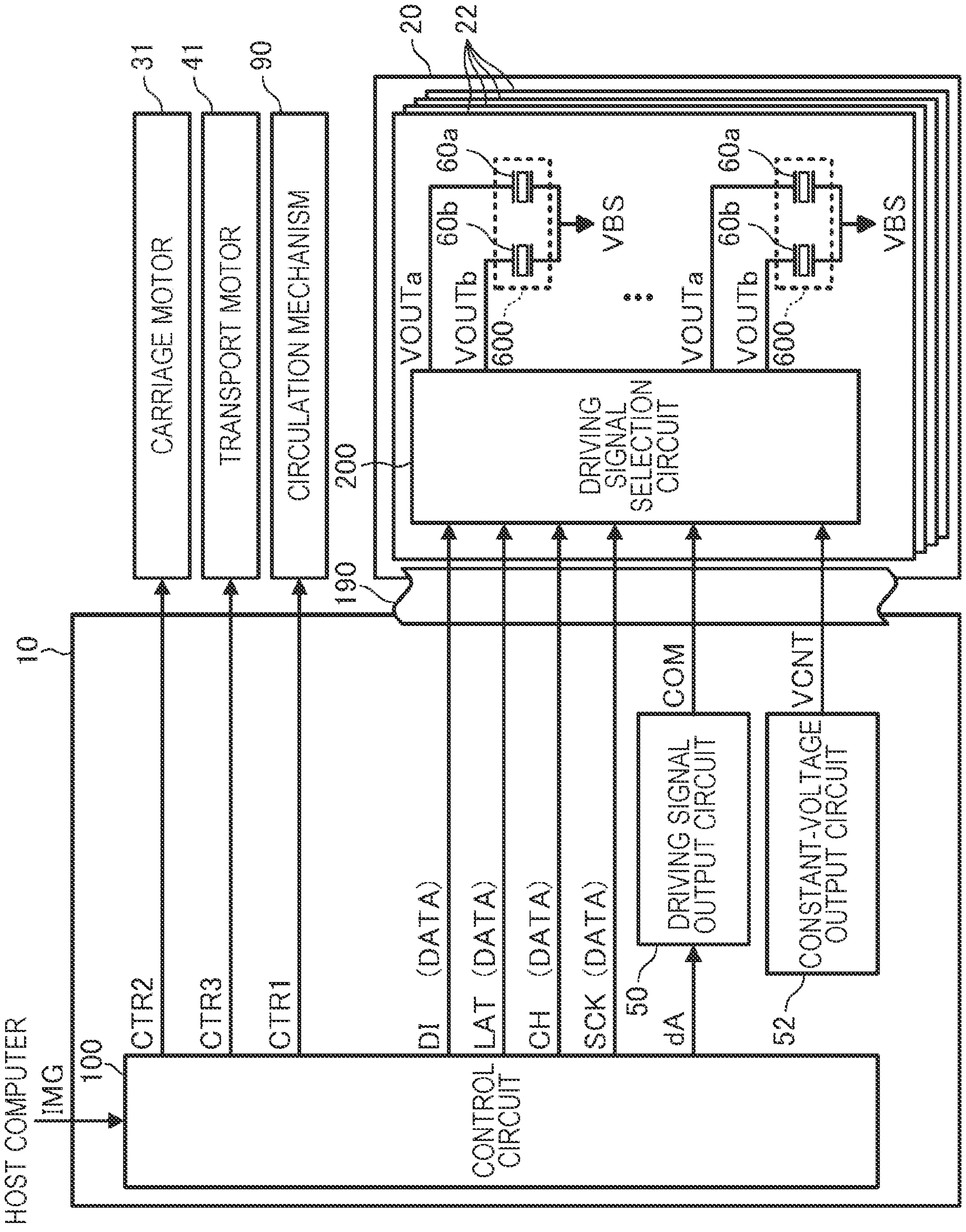
FIG. 2 is a functional block diagram illustrating the structure of the liquid discharging apparatus.

FIG. 2 is a functional block diagram illustrating the structure of the liquid discharging apparatus 1. As illustrated in FIG. 2, the liquid discharging apparatus 1 has the control unit 10 and head unit 20. The control unit 10 and head unit 20 are electrically coupled together through a cable 190, such as a flexible flat cable, that is easy to slide.

The control unit 10 has a control circuit 100, a driving signal output circuit 50, and a constant-voltage output circuit 52.

The control circuit 100 accepts an image information signal IMG that includes information about an image to be formed on the medium P, the image information signal IMG being output from an external device such as a host computer. According to the image information signal IMG, the control circuit 100 outputs, to the head unit 20, a discharge control signal DI, a latch signal LAT, a change signal CH, and a clock signal SCK as discharge data signals DATA, which control individual sections in the liquid discharging apparatus 1.

Specifically, the control circuit 100 creates the control signal CTR1 and outputs it to the circulation mechanism 90. The circulation mechanism 90 accepts the control signal CTR1, after which in response to it, the circulation mechanism 90 supplies ink held in the ink tank 2 to the liquid discharge head 22 and collects ink held in the ejection flow paths in the liquid discharge head 22. The control circuit 100 also creates the control signal CTR2 and outputs it to the carriage motor 31. Thus, the carriage motor 31 is driven. The control circuit 100 also creates the control signal CTR3 and outputs it to the transport motor 41. Thus, the bidirectional movement of the carriage 21 along the X direction and the transport of the medium P along the Y direction are controlled. The control signals CTR1, CTR2, and CTR3 may be entered into the relevant elements through a driver circuit (not illustrated).

The control circuit 100 also creates a base driving signal dA and outputs it to the driving signal output circuit 50. The driving signal output circuit 50 accepts the base driving signal dA, creates the driving signal COM from the base driving signal dA, and outputs the driving signal COM to the head unit 20. Specifically, the driving signal output circuit 50 converts the base driving signal dA that the driving signal output circuit 50 has accepted from digital to analog, performs class-D amplification on the converted analog signal to create the driving signal COM, and then outputs it to the head unit 20.

The constant-voltage output circuit 52 included in the control unit 10 creates the constant-voltage signal VCNT having a constant voltage value from the commercially available voltage supplied to the liquid discharging apparatus 1 or from any of various power supply voltages used in the liquid discharging apparatus 1, and outputs the constant-voltage signal VCNT to the head unit 20. The constant-voltage output circuit 52 of this type may be an alternate current-direct current (AC-DC) converter that converts the commercially available voltage supplied to the liquid discharging apparatus 1 to a direct-current voltage or may be a direct current-direct current (DC-DC) converter that converts any of various power supply voltages used in the liquid discharging apparatus 1 to a direct-current voltage.

The head unit 20 has a plurality of liquid discharge heads 22, each of which has a driving signal selection circuit 200 and a plurality of discharging sections 600.

The driving signal selection circuit 200 accepts the discharge control signal DI, latch signal LAT, change signal CH, clock signal SCK, which are output from the control circuit 100, and also accepts the driving signal COM output from the driving signal output circuit 50 and the constant-voltage signal VCNT output from the constant-voltage output circuit 52. The driving signal selection circuit 200 switches between supply and non-supply of the driving signal COM to the discharging section 600 and also switches between supply and non-supply of the constant-voltage signal VCNT to the discharging section 600, in response to the discharge control signal DI, latch signal LAT, change signal CH, and clock signal SCK that the driving signal selection circuit 200 has accepted.

Each of the plurality of discharging sections 600 has piezoelectric elements 60*a* and 60*b*. A driving signal VOUTa is supplied to one end of the piezoelectric element 60*a*, the driving signal VOUTa being created in the driving signal selection circuit 200 according to whether to supply the driving signal COM to the discharging section 600 and whether to supply the constant-voltage signal VCNT to the discharging section 600. Similarly, a driving signal VOUTb is supplied to one end of the piezoelectric element 60*b*, the driving signal VOUTb being created in the driving signal selection circuit 200 according to whether to supply the driving signal COM to the discharging section 600 and whether to supply the constant-voltage signal VCNT to the discharging section 600. A reference voltage signal VBS is supplied to both the other ends of the piezoelectric elements 60*a* and 60*b*.

The piezoelectric element 60*a* is driven according to the difference in potential between the driving signal VOUTa supplied to the one end and the reference voltage signal VBS supplied to the other end. Similarly, the piezoelectric element 60*b* is driven according to the difference in potential between the driving signal VOUTb supplied to the one end and the reference voltage signal VBS supplied to the other end. The reference voltage signal VBS supplied to the other ends of the piezoelectric elements 60*a* and 60*b* is a DC voltage signal taken as a reference according to which the piezoelectric elements 60*a* and 60*b* are driven. For example, the reference voltage signal VBS may be a signal with a constant potential such as 5.5 VDC or 6 VDC or may be a signal at the ground potential.

When at least one of the piezoelectric elements 60*a* and 60*b* is driven, ink is discharged from the relevant discharging section 600. When ink discharged from the discharging section 600 lands on the medium P, a character or an image is formed on the medium P.

As described above, the liquid discharging apparatus 1 in this embodiment has: a plurality of discharging sections 600, each of which includes the piezoelectric elements 60*a* and 60*b* and discharges ink when at least one of the piezoelectric elements 60*a* and 60*b* is driven; the driving signal output circuit 50 that outputs the driving signal COM, on which the driving signal VOUTa, which drives the piezoelectric element 60*a*, and driving signal VOUTb, which drives the piezoelectric element 60*b*, are based; and the constant-voltage output circuit 52 that outputs the constant-voltage signal VCNT having a constant voltage value.

2. Structure of the Liquid Discharge Head

Figure 3:
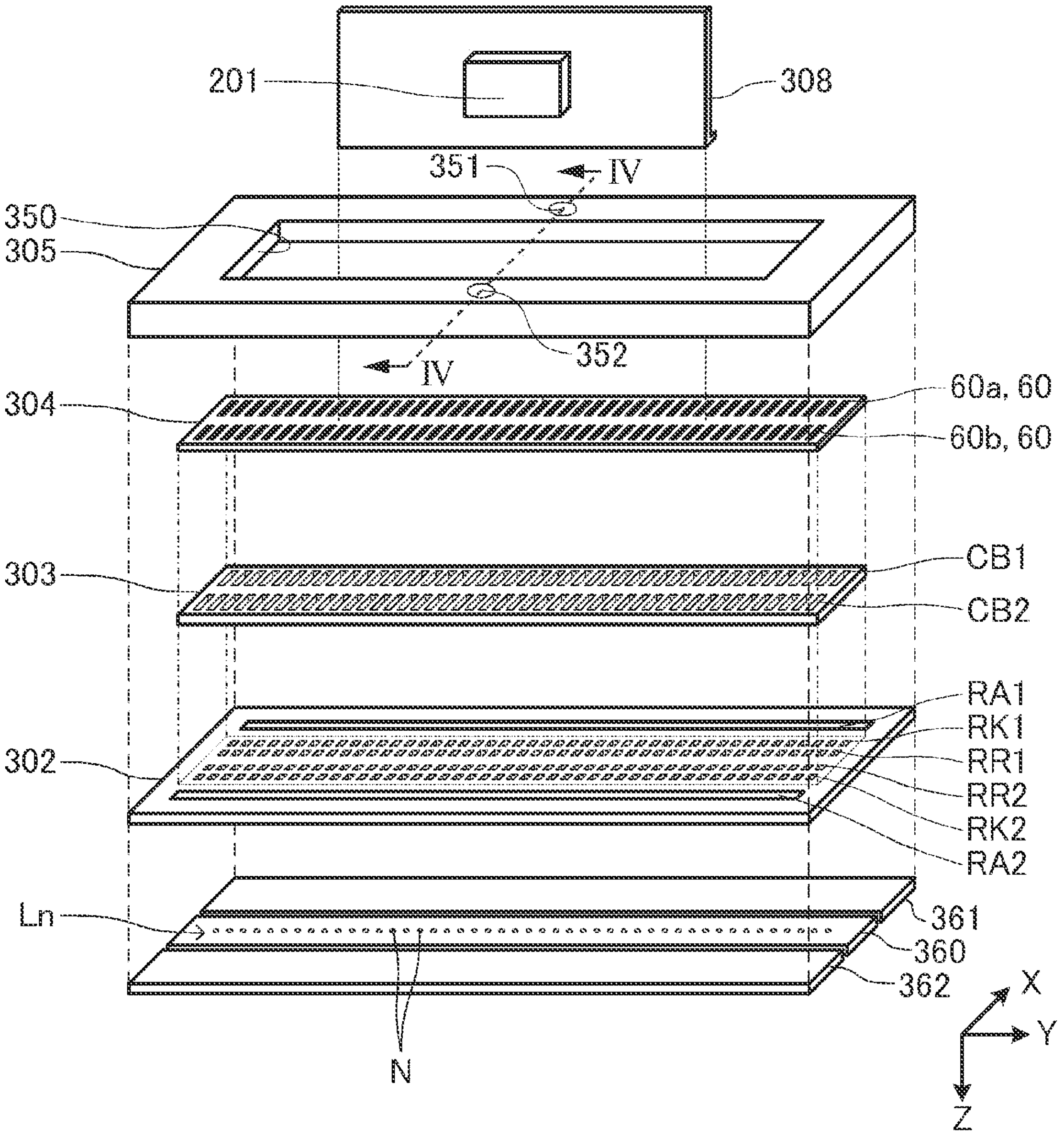
FIG. 3 is an exploded perspective view of a liquid discharge head.
Figure 4:
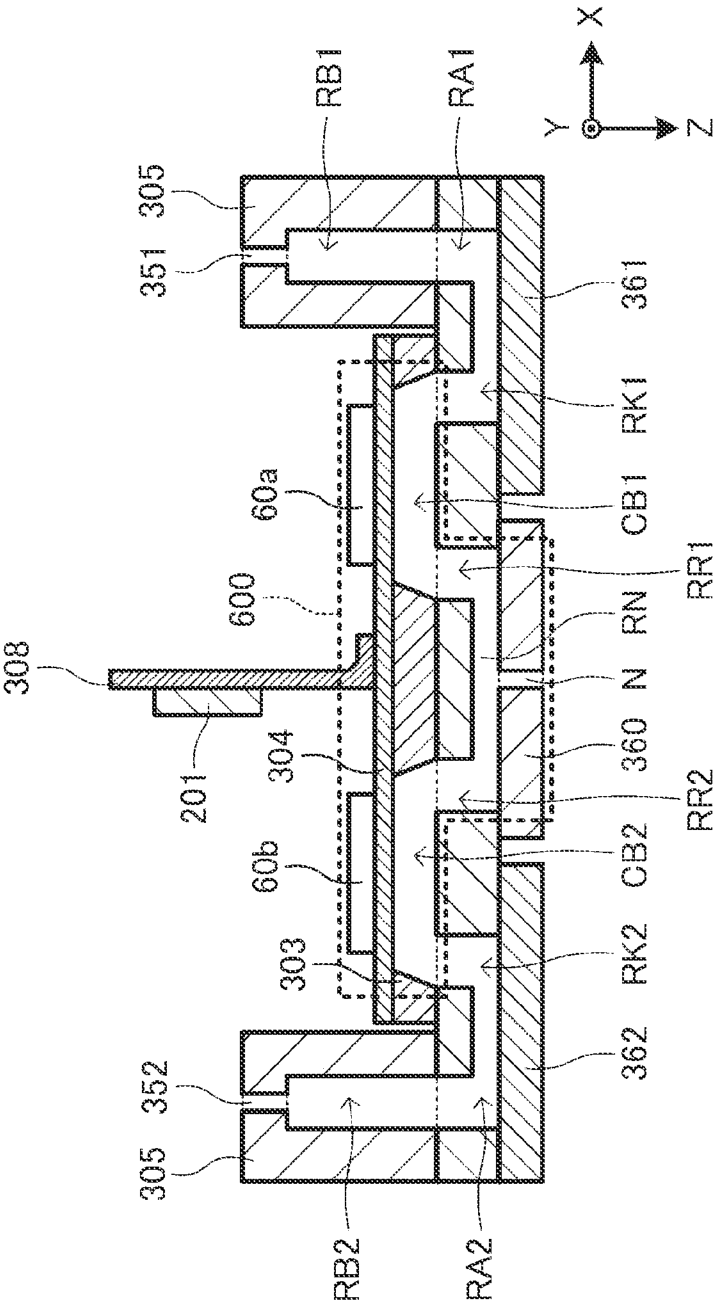
FIG. 4 is a sectional view taken along line IV-IV in FIG. 3.

Next, the structure of the liquid discharge head 22 in which the driving signal selection circuit 200 is provided will be described. FIG. 3 is an exploded perspective view of the liquid discharge head 22. FIG. 4 is a sectional view taken along line IV-IV in FIG. 3.

As illustrated in FIGS. 3 and 4, the liquid discharge head 22 has a nozzle substrate 360, compliance sheets 361 and 362, a communication plate 302, a pressure chamber substrate 303, a vibration plate 304, a holding chamber forming substrate 305, and a wiring board 308.

The nozzle substrate 360 is a plate-like member that is elongated in the Y direction and extends substantially parallel to an XY plane. M nozzles N are formed in the nozzle substrate 360. Each nozzle N is a through-hole formed in the nozzle substrate 360. In the nozzle substrate 360, the M nozzles N are arranged side by side along the Y direction. In the description below, a row of nozzles N arranged side by side along the Y direction will also be referred to as a nozzle row Ln. Here, the phrase “substantially parallel” indicates not only that the nozzle substrate 360 is completely parallel to an XY plane but also that when error is taken into consideration, the nozzle substrate 360 can be regarded to be parallel to an XY plane.

The communication plate 302 is positioned on the −Z side of the nozzle substrate 360. The communication plate 302 is a plate-like member that is elongated in the Y direction and extends substantially parallel to an XY plane. In the communication plate 302, ink flow paths are formed.

Specifically, a supply flow path RA1 and an ejection flow path RA2 are formed in the communication plate 302. The supply flow path RA1 is positioned on the +X side of the communication plate 302 and extends along the Y direction. The ejection flow path RA2 is positioned on the −X side of the communication plate 302 and extends along the Y direction.

In the communication plate 302, M coupling flow paths RK1 are formed in one-to-one correspondence with the M nozzles N; M coupling flow paths RK2 are formed in one-to-one correspondence with the M nozzles N; M communication flow paths RR1 are formed in one-to-one correspondence with the M nozzles N; M communication flow paths RR2 are formed in one-to-one correspondence with the M nozzles N; and M nozzle flow paths RN are formed in one-to-one correspondence with the M nozzles N.

The M coupling flow paths RK1 are arranged side by side along the Y direction on the −X side of the supply flow path RA1. The M communication flow paths RR1 are arranged side by side along the Y direction on the −X side of the M coupling flow paths RK1 arranged side by side along the Y direction. The M coupling flow paths RK2 are arranged side by side along the Y direction on the +X side of the ejection flow path RA2 and on the −X side of the M communication flow paths RR1 arranged side by side along the Y direction. The M communication flow paths RR2 are arranged side by side along the Y direction on the +X side of the M coupling flow paths RK2 arranged side by side along the Y direction and on the −X side of the M communication flow paths RR1 arranged side by side along the Y direction. The nozzle flow path RN causes the communication flow path RR1 and communication flow path RR2 that correspond to the same nozzle N to communicate with each other. When the communication plate 302 is viewed from the Z direction, the nozzle N is positioned at a substantially central position of the nozzle flow path RN in the X direction. Here, the phrase "substantially central position" indicates not only that the nozzle flow path RN is positioned strictly at the central position but also that when error is taken into consideration, the nozzle flow path RN can be regarded to be positioned at the central position.

The pressure chamber substrate 303 is positioned on the −Z side of the communication plate 302. The pressure chamber substrate 303 is a plate-like member that is elongated in the Y direction and extends substantially parallel to an XY plane. In the pressure chamber substrate 303, ink flow paths are formed.

Specifically, in the pressure chamber substrate 303, M pressure chambers CB1 are formed in one-to-one correspondence with the M nozzles N so as to be arranged side by side in the Y-axis direction, and M pressure chambers CB2 are formed in one-to-one correspondence with the M nozzles N so as to be arranged side by side in the Y-axis direction. The pressure chamber CB1 causes the coupling flow path RK1 and communication flow path RR1 that correspond to the same nozzle N to communicate with each other. More specifically, when the pressure chamber CB1 is viewed from the Z direction, the coupling flow path RK1 and the end of the pressure chamber CB1 on the +X side communicate with each other, and the communication flow path RR1 and the end of the pressure chamber CB1 on the −X side communicate with each other, so the coupling flow path RK1 and communication flow path RR1 that correspond to the same nozzle N communicate with each other through the pressure chamber CB1. Similarly, the pressure chamber CB2 causes the coupling flow path RK2 and communication flow path RR2 that correspond to the same nozzle N to communicate with each other. More specifically, when the pressure chamber CB2 is viewed from the Z direction, the coupling flow path RK2 and the end of the pressure chamber CB2 on the −X side communicate with each other, and the communication flow path RR2 and the end of the pressure chamber CB2 on the +X side communicate with each other, so the coupling flow path RK2 and communication flow path RR2 that correspond to the same nozzle N communicate with each other through the pressure chamber CB2.

The vibration plate 304 is positioned on the −Z side of the pressure chamber substrate 303. The vibration plate 304 is a plate-like member that is elongated in the Y direction and extends substantially parallel to an XY plane. The vibration plate 304 can elastically vibrate.

On the −Z side of the vibration plate 304, M piezoelectric elements 60*a* and M piezoelectric elements 60*b* are arranged side by side along the Y direction. The M piezoelectric elements 60*a*, which are part of the plurality of piezoelectric elements 60 included in the liquid discharge head 22, are in one-to-one correspondence with the M pressure chambers CB1. The M piezoelectric elements 60*b*, which are also part of the plurality of piezoelectric elements 60 included in the liquid discharge head 22, are in one-to-one correspondence with the M pressure chambers CB2. That is, 2M piezoelectric elements 60 are arranged side by side in two rows on the −Z side of the vibration plate 304.

The piezoelectric element 60*a* is driven according to a change in the potential of the supplied driving signal VOUTa, and the piezoelectric elements 60*b* is driven according to a change in the potential of the supplied driving signal VOUTb. The vibration plate 304 is displaced in response to the driving of the piezoelectric elements 60*a* and 60*b*. As a result, the internal pressure in the pressure chambers CB1 and CB2 changes. When the internal pressure in the pressure chambers CB1 and CB2 changes, ink filled in the pressure chambers CB1 and CB2 respectively passes through the communication flow paths RR1 and RR2, passes through the nozzle flow path RN, and is then discharged from the nozzle N.

The wiring board 308 is coupled to the surface of the vibration plate 304 on the −Z side. The wiring board 308 propagates various signals including the discharge data signals DATA and driving signal COM to the interior of the liquid discharge head 22. A flexible printed circuit (FPC) or another board having a flexible structure is used as the wiring board 308 of this type. An integrated circuit 201 is mounted on the wiring board 308 by a chip-on-film (COF) method. The driving signal selection circuit 200 described above is mounted in this integrated circuit 201. That is, the wiring board 308 propagates various signals including the discharge data signals DATA and driving signal COM to the integrated circuit 201 and also respectively propagates the driving signals VOUTa and VOUTb, which are output from the driving signal selection circuit 200 included in the integrated circuit 201, to the piezoelectric elements 60*a* and 60*b*.

The holding chamber forming substrate 305 is positioned on the −Z side of the communication plate 302. The holding chamber forming substrate 305 is a member that is elongated in the Y and in which ink flow paths are formed.

Specifically, a supply flow path RB1 and an ejection flow path RB2 are formed in the holding chamber forming substrate 305. The supply flow path RB1 communicates with the supply flow path RA1. The ejection flow path RB2 communicates with the ejection flow path RA2. In addition, the holding chamber forming substrate 305 has an inlet 351 communicating with the supply flow path RB1 and an outlet 352 communicating with the ejection flow path RB2. Ink is supplied from the ink tank 2 to the inlet 351. Thus, ink is supplied from the ink tank 2 through the inlet 351 into the supply flow path RB1. Ink held in the ejection flow path RB2 is collected through the outlet 352. Ink collected through the outlet 352 is returned to the ink tank 2. An opening 350 is formed in the holding chamber forming substrate 305. The pressure chamber substrate 303, vibration plate 304, and wiring board 308 are disposed inside the opening 350.

In the liquid discharge head 22 structured as described above, ink supplied from the ink tank 2 to the inlet 351 passes through the supply flow path RB1 and flows into the supply flow path RA1. After having flowed into the supply flow path RA1, ink branches into the coupling flow path RK1 for each nozzle N and enters the relevant pressure chamber CB1. Part of ink that has flowed into the pressure chamber CB1 passes through the communication flow path RR1, nozzle flow path RN, and communication flow path RR2, and then flows into the relevant pressure chamber CB2. Part of ink that has flowed into the pressure chamber CB2 passes through the coupling flow path RK2, ejection flow path RA2, and ejection flow path RB2, and is then ejected from the outlet 352.

When the piezoelectric element 60*a* is driven by the driving signal VOUTa, part of ink filled in the pressure chamber CB1 passes through the communication flow path RR1 and nozzle flow path RN and is then discharged from the nozzle N. When the piezoelectric elements 60*b* is driven by the driving signal VOUTb, part of ink filled in the pressure chamber CB2 passes through the communication flow path RR2 and nozzle flow path RN and is then discharged from the nozzle N.

The compliance sheet 361, which is positioned on the +Z side of the communication plate 302, closes the supply flow path RA1 and coupling flow path RK1 formed in the communication plate 302. This compliance sheet 361 is formed by including an elastic material. When variations in the pressure of ink occur in the supply flow path RA1 and coupling flow path RK1, the compliance sheet 361 eliminates these variations. Similarly, the compliance sheet 362, which is positioned on the +Z side of the communication plate 302, closes the ejection flow path RA2 and coupling flow path RK2 formed in the communication plate 302. This compliance sheet 362 is formed by including an elastic material. When variations in the pressure of ink occur in the ejection flow path RA2 and coupling flow path RK2, the compliance sheet 362 eliminates these variations.

As described above, the liquid discharge head 22 included in the liquid discharging apparatus 1 according to this embodiment has: pressure chambers CB1, in each of which internal pressure changes due to the driving of the relevant piezoelectric element 60*a*; pressure chambers CB2, in each of which internal pressure changes due to the driving of the relevant piezoelectric elements 60*b*; and nozzles N, each of which communicates with the relevant pressure chambers CB1 and CB2 and discharges ink. Due to a change in the internal pressure in the pressure chamber CB1, the change being caused when the piezoelectric element 60*a* is driven, and to a change in the internal pressure in the pressure chamber CB2, the change being caused when the piezoelectric element 60*b* is driven, ink filled in the pressure chamber CB1 and ink filled in the pressure chamber CB2 are discharged from the nozzle N. Thus, a driving capacity can be made higher than when ink filled in a single pressure chamber is discharged by using a single piezoelectric element 60. As a result, even when highly viscous ink is used, a stable discharge property can be assured.

The structure including the piezoelectric elements 60*a* and 60*b*, pressure chambers CB1 and CB2, communication flow paths RR1 and RR2, and nozzle N is equivalent to the discharging section 600 that discharges ink when at least one of the piezoelectric elements 60*a* and 60*b* is driven.

3. Example of a Driving Signal Waveform

Figure 5:
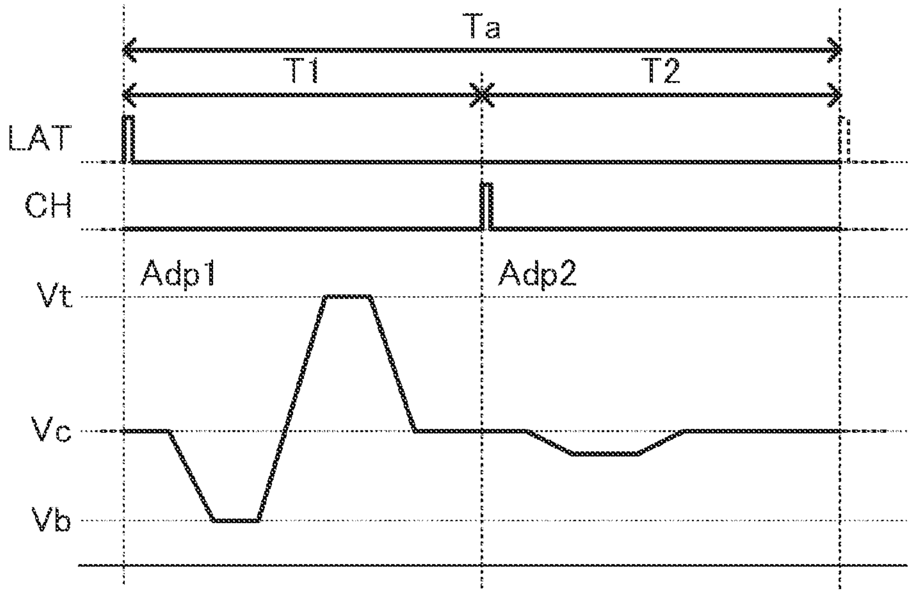
FIG. 5 illustrates an example of the waveform of a driving signal.

Now, an example of the waveform of the driving signal COM output from the driving signal output circuit 50 will be described. FIG. 5 illustrates an example of the waveform of the driving signal COM. As illustrated in FIG. 5, the driving signal COM includes a trapezoidal waveform Adp1, which appears in a period T1 continuing from when a latch signal LAT rises until a change signal CH rises, and also includes a trapezoidal waveform Adp2, which appears in a period T2 continuing until a next latch signal LAT rises, the trapezoidal waveform Adp1 being continuous to the trapezoidal waveform Adp2. That is, the driving signal output circuit 50 outputs the driving signal COM, in which the trapezoidal waveform Adp1 and trapezoidal waveform Adp2 are continuously combined together, in each cycle Ta determined by the latch signal LAT. In other words, the latch signal LAT is equivalent to the starting point of the cycle Ta of the driving signal COM.

The trapezoidal waveform Adp1 includes: a constant period at a voltage Vc; a constant period at a voltage Vb lower than the voltage Vc, the constant period following the constant period at the voltage Vc; a constant period at a voltage Vt higher than the voltage Vc, the constant period following the constant period at the voltage Vb; and a constant period at the voltage Vc, the constant period following the constant period at the voltage Vt. That is, the driving signal COM includes the trapezoidal waveform Adp1, the voltage value of which starts from the voltage Vc, changes to the voltage Vb and then to the voltage Vt, and terminates at the voltage Vc.

The voltage Vc functions as a reference potential used as a reference in the displacement of the piezoelectric element 60. While the voltage Vc is supplied to the piezoelectric elements 60*a* and 60*b*, they are held with a certain displacement. When the voltage value of the trapezoidal waveform Adp1 supplied to the piezoelectric elements 60*a* and 60*b* changes from the voltage Vc to the voltage Vb, the piezoelectric elements 60*a* and 60*b* warp in the upward direction in FIG. 4, expanding the internal volumes of the pressure chambers CB1 and CB2. Therefore, ink is drawn into the pressure chambers CB1 and CB2. After that, when the voltage value of the trapezoidal waveform Adp1 supplied to the piezoelectric elements 60*a* and 60*b* changes from the voltage Vb to the voltage Vt, the piezoelectric elements 60*a* and 60*b* warp in the downward direction in FIG. 4, contracting the internal volumes of the pressure chambers CB1 and CB2. Therefore, ink held in the pressure chambers CB1 and CB2 is discharged from the nozzle N. That is, the trapezoidal waveform Adp1 is a waveform used to discharge ink from the discharging section 600.

The trapezoidal waveform Adp2 is a signal waveform having a smaller voltage amplitude than the trapezoidal waveform Adp1. When the piezoelectric elements 60*a* and 60*b* are driven to the extent that ink is not discharged from the discharging section 600, the trapezoidal waveform Adp2 vibrates ink in the vicinity of the nozzle N. This reduces the fear that ink in the vicinity of the nozzle N becomes more viscous, and thereby stabilizes the property of discharging ink from the discharging section 600. That is, the trapezoidal waveform Adp2 is a signal waveform that prevents ink from being discharged from the discharging section 600. In the description below, the trapezoidal waveform Adp2 may be referred to as a micro-vibration waveform, and an operation to drive the piezoelectric elements 60*a* and 60*b* to the extent that ink in the vicinity of the nozzle N vibrates when the trapezoidal waveform Adp2 is supplied may be referred to as a micro-vibration.

As described above, the driving signal COM includes, in the cycle Ta, the trapezoidal waveform Adp1 used to discharge ink from the discharging section 600 and the trapezoidal waveform Adp2 used to reduce an increase in the viscosity of ink in the vicinity of the nozzle N without discharging ink from the discharging section 600. However, the signal waveforms included in the driving signal COM are not limited to the trapezoidal waveforms Adp1 and Adp2. Various other signal waveforms may be used according to the viscosity of ink to be discharged, the transport speed of the medium P, the movement speed of the carriage 21, and other parameters.

4. Structure and Operation of the Driving Signal Selection Circuit

Next, the structure and operation of the driving signal selection circuit 200 will be described. The driving signal selection circuit 200 accepts the discharge control signal DI, latch signal LAT, change signal CH, and clock signal SCK, which are output from the control circuit 100, and also accepts the driving signal COM output from the driving signal output circuit 50 and the constant-voltage signal VCNT output from the constant-voltage output circuit 52. The driving signal selection circuit 200 switches between supply and non-supply of the driving signal COM to the discharging section 600 and also switches between supply and non-supply of the constant-voltage signal VCNT to the discharging section 600, in response to the discharge control signal DI, latch signal LAT, change signal CH, and clock signal SCK that the driving signal selection circuit 200 has accepted.

Figure 6:
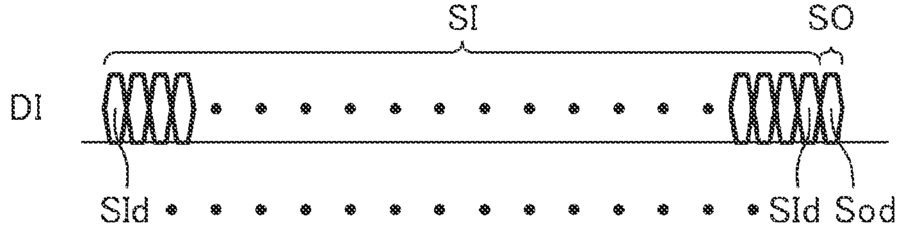
FIG. 6 illustrates an example of the structure of data in a discharge control signal.

Before the structure and operation of the driving signal selection circuit 200 is described, the structure of data in the discharge control signal DI entered into the driving signal selection circuit 200 will be described first. FIG. 6 illustrates an example of the structure of data in the discharge control signal DI. As illustrated in FIG. 6, the discharge control signal DI includes a print data signal SI and an output selection control signal SO, which follows the print data signal SI.

The print data signal SI includes one-bit print data SId in correspondence to each of the M discharging sections 600 included in the liquid discharge head 22, the print data SId being used to select whether to discharge ink from the relevant discharging section 600. That is, the print data signal SI has a total of M bits to control discharging of ink from the M discharging sections 600.

The output selection control signal SO includes one-bit output selection data SOd used to select whether to supply the driving signal VOUTb in response to the driving signal COM or supply the driving signal VOUTb in response to the VCNT for the piezoelectric elements 60*b* included in the M discharging sections 600. That is, the output selection control signal SO has a total of one bit common to all of the M discharging sections 600.

As described above, the discharge control signal DI in this embodiment has a total of M+1 bits representing the M-bit print data signal SI and one-bit output selection control signal SO. This discharge control signal DI having M+1 bits is entered into the driving signal selection circuit 200 in synchronization with the clock signal SCK.

The print data signal SI included in the discharge control signal DI is not limited to M bits. When, for example, the liquid discharge head 22 forms, on the medium P, dots with a gray scale of four levels including non-discharging, each piece of print data SId included in the print data signal SI may include two-bit information to represent the gray scale of four levels. In this case, the print data signal SI has a total of 2M bits to control discharging of ink from the M discharging sections 600.

The output selection control signal SO included in the discharge control signal DI is not limited to one bit. For example, in the liquid discharge head 22, it may be selected, in each of the periods T1 and T2 determined by the latch signal LAT and change signal CH, whether to supply the driving signal VOUTb to the piezoelectric elements 60*b* included in the M discharging sections 600 in response to the driving signal COM or whether to supply the driving signal VOUTb to the piezoelectric elements 60*b* in response to the VCNT. To do so, the output selection control signal SO may include one-bit information that selects whether to supply the driving signal VOUTb in response to the driving signal COM or whether to supply the driving signal VOUTb in response to the VCNT in the period T1 as well as one-bit information that selects whether to supply the driving signal VOUTb in response to the driving signal COM or whether to supply the driving signal VOUTb in response to the VCNT in the period T2. In this case, the output selection control signal SO is a two-bit signal.

The discharge control signal DI may include information about conditions for driving the piezoelectric elements 60*a* and 60*b* such as a signal that stipulates waveform selection by a decoder DC, which will be described later, besides the print data signal SI and output selection control signal SO.

Figure 7:
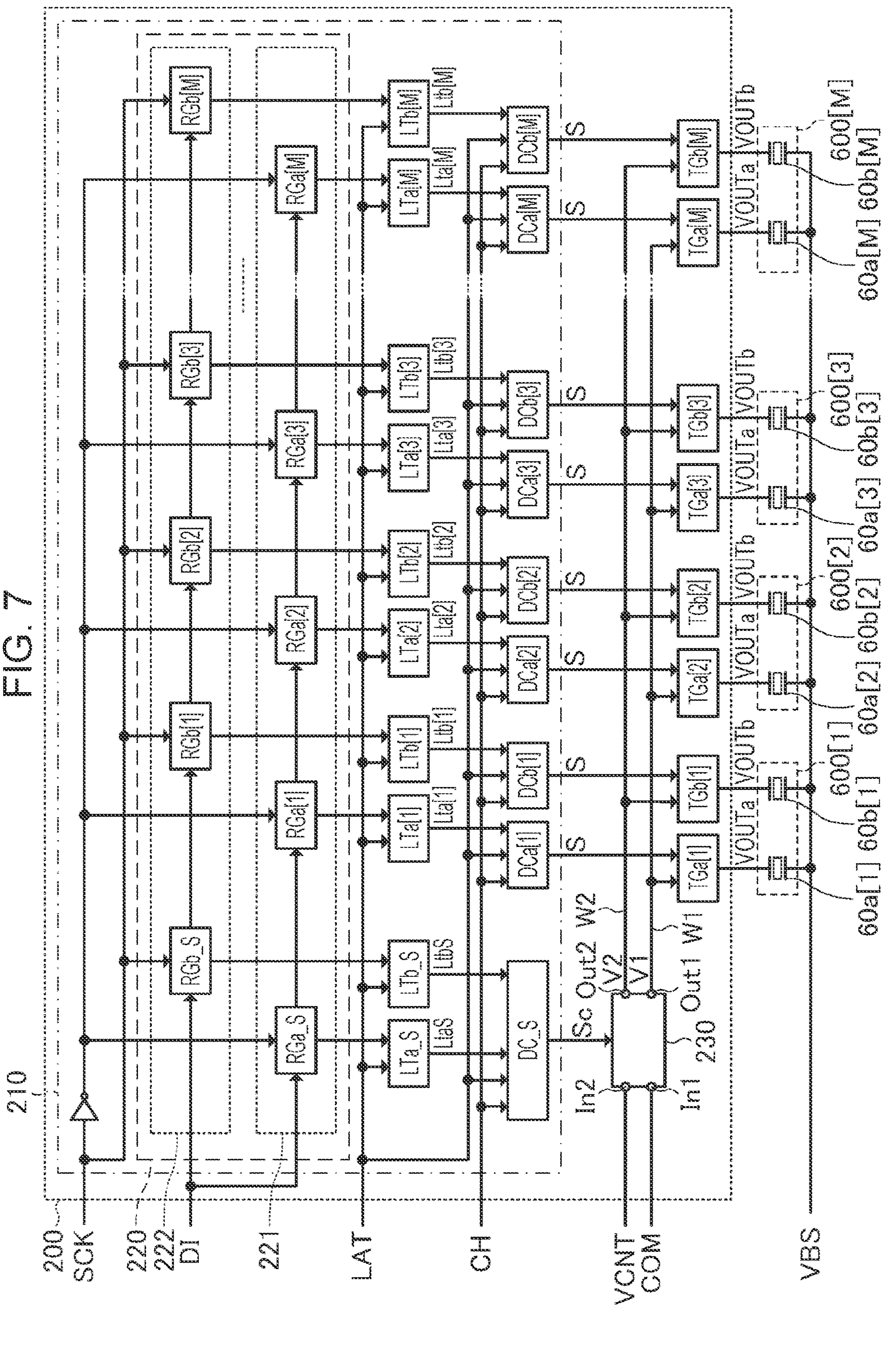
FIG. 7 illustrates the structure of a driving signal selection circuit.

Next, the structure and operation of the driving signal selection circuit 200 will be described. FIG. 7 illustrates the structure of the driving signal selection circuit 200. To individually distinguish the M discharging sections 600 in the description below, they may be referred to as discharging sections 600[1] to 600[M]. In this case, the piezoelectric element 60*a* included in discharging section 600[i], i being any of 1 to M, may be referred to as the piezoelectric element 60*a*[i], and the piezoelectric element 60*b* included in discharging section 600[i] may be referred to as the piezoelectric element 60*b*[i]. In addition, of the print data SId included in the print data signal SI in correspondence to the M discharging sections 600, print data SId corresponding to the discharging section 600[i] may be referred to as print data SId[i].

As illustrated in FIG. 7, the driving signal selection circuit 200 has a selection control circuit 210, a path switching circuit 230, and selection circuits TGa[1] to TGa[M] and TGb[1] to TGb[M]. When the selection circuits TGa[1] to TGa[M] do not need to be individually distinguished in the description below, each of them may be simply referred to as the selection circuit TGa. Similarly, when the selection circuits TGb[1] to TGb[M] do not need to be individually distinguished, each of them may be simply referred to as the selection circuit TGb. When the selection circuit TGa and selection circuit TGb do not need to be distinguished from each other, each of them may be simply referred to as the selection circuit TG.

The selection control circuit 210 includes a shift register 220, latch circuits LTa_S, LTb_S, LTa[1] to LTa[M] and LTb[1] to LTb[M], and decoders DC_S, DCa[1] to DCa[M] and DCb[1] to DCb[M]. When latch circuits LTa[1] to LTa[M] do not need to be individually distinguished in the description below, each of them may be simply referred to as the latch circuit LTa. Similarly, latch circuits LTb[1] to LTb[M] do not need to be individually distinguished in the description below, each of them may be simply referred to as the latch circuit LTb. When the latch circuits LTa and LTb do not need to be distinguished from each other, each of them may be simply referred to as the latch circuit LT. Similarly, the decoders DCa[1] to DCa[M] do not need to be individually distinguished, each of them may be simply referred to as a decoder DCa. When the decoders DCb[1] to DCb[M] do not need to be individually distinguished, each of them may be simply referred to as the decoder DCb. In addition, when the decoder DCa and decoder DCb do not need to be distinguished from each other, each of them may be simply referred to as the decoder DC.

The shift register 220 has a first shift register 221 and a second shift register 222.

The first shift register 221 accepts the discharge control signal DI and a signal resulting from inversion of the logic level of the clock signal SCK by an inverter. The first shift register 221 includes registers RGa_S and RGa[1] to RGa [M]. In the first shift register 221, the registers RGa_S and RGa[1] to RGa[M] are coupled in series in the order of the registers RGa_S, RGa[1], RGa[2], . . . , RGa[M] from the upstream into which the discharge control signal DI is entered to the downstream.

Upon receipt of the discharge control signal DI, the first shift register 221 structured as described above transfers the discharge control signal DI to the registers RGa_S, RGa[1], RGa[2], . . . , and RGa[M] in that order on falling edges of the clock signal SCK. When the discharge control signal DI has been completely entered into the first shift register 221 and the supply of the clock signal SCK is stopped, the output selection data SOd is held in the register RGa_S and print data SId[1] to SId[M] are respectively held in the registers RGa[1] to RGa[M].

The second shift register 222 accepts the discharge control signal DI and clock signal SCK. The second shift register 222 includes registers RGb_S and RGb[1] to RGb [M]. In the second shift register 222, the registers RGb_S and RGb[1] to RGb[M] are coupled in series in the order of the registers RGb_S, RGb[1], RGb[2], . . . , RGb[M] from the upstream into which the discharge control signal DI is entered to the downstream.

Upon receipt of the discharge control signal DI, the second shift register 222 structured as described above transfers the discharge control signal DI to the registers RGb_S, RGb[1], RGb[2], . . . , and RGb[M] in that order on rising edges of the clock signal SCK. When the discharge control signal DI has been completely entered into the second shift register 222 and the supply of the clock signal SCK is stopped, the output selection data SOd is held in the register RGb_S and print data SId[1] to SId[M] are respectively held in registers RGb[1] to RGb[M].

The latch circuit LTa_S is provided in correspondence to the register RGa_S. The latch circuit LTa_S latches the output selection data SOd held in the register RGa_S as latch data LtaS on a rising edge of the latch signal LAT. Similarly, the latch circuit LTb_S is provided in correspondence to the register RGb_S. The latch circuit LTb_S latches the output selection data SOd held in the register RGb_S as latch data LtbS on a rising edge of the latch signal LAT.

The latch data LtaS latched by the latch circuit Lta_S and the latch data LtbS latched by the latch circuit LTb_S are entered into the decoder DC_S. The latch signal LAT and change signal CH are also entered into the decoder DC_S. The decoder DC_S creates a selection signal Sc, which selects a logic level determined by the latch data LtaS and latch data LtbS, in each of the periods T1 and T2 determined by the latch signal LAT and change signal CH, and outputs the selection signal Sc from the selection control circuit 210.

FIG. 8 illustrates an example of decoding by the decoder DC_S. As illustrated in FIG. 8, when the decoder DC_S accepts latch data LtaS with a value of 1 and latch data LtbS with a value of 1, the decoder DC_S creates a selection signal Sc that goes high in each of the period T1 and period T2 and outputs the selection signal Sc from the selection control circuit 210; and when the decoder DC_S accepts latch data LtaS with a value of 0 and latch data LtbS with a value of 0, the decoder DC_S creates a low selection signal Sc in each of the period T1 and period T2 and outputs the selection signal Sc from the selection control circuit 210.

When the latch circuit LTa_S is to latch information held in the register RGa_S as latch data LtaS, output selection data SOd is held in the register RGa_S. Similarly, when the latch circuit LTb_S is to latch information held in the register RGb_S as latch data LtbS, output selection data SOd is held in the register RGb_S. In view of this, there is a match between the logic level of the latch data LtaS latched by the latch circuit LTa_S and the logic level of the latch data LtbS latched by the latch circuit LTb_S. Therefore, when the decoder DC_S accepts latch data LtaS with a value of 0 and latch data LtbS with a value of 1 or when the decoder DC_S accepts latch data LtaS with a value of 1 and latch data LtbS with a value of 0, the decoder DC_S may decide that the accepted latch data LtaS or latch data LtbS is not correct and may hold the last logic level without changing the logic level of the selection signal Sc to be output.

Referring again to FIG. 7, the latch circuits LTa[1] to LTa[M] are provided in correspondence to the registers RGa[1] to RGa[M]. The latch circuits LTa[1] to LTa[M] concurrently latch print data SId[1] to SId[M], which are respectively held in the registers RGa[1] to RGa[M], as latch data Lta[1] to Lta[M] on rising edges of the latch signal LAT. Specifically, the latch circuit LTa[1] latches print data SId [1], which is held in the register RGa[1], as latch data Lta[1] on a rising edge of the latch signal LAT; and the latch circuit LTa[i] latches print data SId[i], which is held in the register RGa[i], as latch data Lta[i] on a rising edge of the latch signal LAT. In the description below, when latch data Lta[1] to Lta[M] do not need to be individually distinguished, each of them may be simply referred to as latch data Lta. That is, in the description below, it will be assumed that the latch circuit LTa latches print data SId held in the register RGa as latch data Lta on a rising edge of the latch signal LAT.

Similarly, the latch circuits LTb[1] to LTb[M] are provided in correspondence to registers RGb[1] to RGb[M]. The latch circuits LTb[1] to LTb[M] concurrently latch print data SId[1] to SId[M], which are respectively held in the registers RGb[1] to RGb[M], as latch data Ltb[1] to Ltb[M] on rising edge of the latch signal LAT. Specifically, the latch circuit LTb[1] latches print data SId[1], which is held in the register RGb[1], as latch data Ltb[1] on a rising edge of the latch signal LAT; and the latch circuit LTb[i] latches print data SId[i], which is held in the register RGb[i], as latch data Ltb[i] on a rising edge of the latch signal LAT. In the description below, when latch data Ltb[1] to Ltb[M] do not need to be individually distinguished, each of them may be simply referred to as latch data Ltb. That is, in the description below, it will be assumed that the latch circuit LTb latches print data SId held in the register RGb as latch data Ltb on a rising edge of the latch signal LAT.

Latch data Lta[1] to Lta[M] that have been respectively latched by the latch circuits LTa[1] to LTa[M] are entered into their respective decoders DCa[1] to DCa[M]. The latch signal LAT and change signal CH are also entered into the decoders DCa[1] to DCa[M]. The decoders DCa[1] to DCa[M] each create a selection signal S having a logic level determined by the latch data Lta[1] to Lta[M] in each of the periods T1 and T2 determined by the latch signal LAT and change signal CH, and outputs the selection signal S from the selection control circuit 210.

Similarly, latch data Ltb[1] to Ltb[M] that have been respectively latched by the latch circuits LTb[1] to LTb[M] are entered into their respective decoders DCb[1] to DCb [M]. The latch signal LAT and change signal CH are also entered into the decoders DCb[1] to DCb[M]. The decoders DCb[1] to DCb[M] each create a selection signal S having a logic level determined by the latch data Ltb[1] to Ltb[M] in each of the periods T1 and T2 determined by the latch signal LAT and change signal CH, and outputs the selection signal S from the selection control circuit 210.

FIG. 9 illustrates an example of decoding by the decoders DCa[1] to DCa[M]. The drawing also applies to the decoders DCb[1] to DCb[M]. Therefore, decoding by the decoders DCa[1] to DCa[M] will be described with reference to FIG. 9 and descriptions for the decoders DCb[1] to DCb[M] will be omitted. In FIG. 9, data corresponding to part of the decoders DCb[1] to DCb[M] is indicated together by being parenthesized.

As illustrated in FIG. 9, when the decoder DCa accepts latch data Lta with a value of 0, the decoder DCa creates a selection signal S that goes low in the period T1 and goes high in the period T2 and outputs the selection signal S from the selection control circuit 210; and when the decoder DCa accepts latch data Lta with a value of 1, the decoder DCa creates a selection signal S that goes high in the period T1 and goes low in the period T2 and outputs the selection signal S from the selection control circuit 210.

When the latch circuit LTa[i] is to latch information held in the register RGa[i] as latch data Lta[i], print data SId[i] included in the print data signal SI is held in the register RGa[i]. Similarly, when the latch circuit LTb[i] is to latch information held in the register RGb[i] as latch data Ltb[i], print data SId[i] included in the print data signal SI is held in the register RGb[i]. That is, there is a match between the logic level of the latch data Lta[i] latched by the latch circuit LTa[i] and the logic level of the latch data Ltb[i] latched by the latch circuit LTb[i]. Therefore, there is a match between the logic level of the selection signal S output from the decoder DCa[i] and the logic level of the selection signal S output from the decoder DCb[i]. That is, the decoder DCa[i] and decoder DCb[i], which correspond to the discharging section 600[i], output selection signals S having the same logic level.

As described above, the selection control circuit 210 creates a selection signal Sc and 2M selection signals S corresponding to the piezoelectric elements 60*a* and 60*b* included in M discharging sections 600 in response to the discharge control signal DI, latch signal LAT, change signal CH, and clock signal SCK output from the control circuit 100, and outputs these signals.

The selection signal Sc output from the selection control circuit 210 is entered into the path switching circuit 230. The driving signal COM is entered into the input portion In1 of the path switching circuit 230. The constant-voltage signal VCNT is entered into the input portion In2 of the path switching circuit 230. The path switching circuit 230 selects the driving signal COM or constant-voltage signal VCNT according to the logic level of the selection signal Sc. Then, the path switching circuit 230 outputs the selected signal as a voltage signal V1 from an output portion Out1 and also outputs the selected signal as a voltage signal V2 from an output portion Out2.

FIG. 10 illustrates an example of the path switching circuit 230. As illustrated in FIG. 10, the path switching circuit 230 has switches SW1 and SW2. One end of the switch SW1 is coupled to the input portion In2 and the other end of the switch SW1 is coupled to the output portion Out2. One end of the switch SW2 is coupled to the output portion Out1 and the other end of the switch SW1 is coupled to the output portion Out2.

When a high selection signal Sc is entered into the path switching circuit 230, the switch SW1 is controlled so as not to create a continuity between its one end and the other end and the switch SW2 is controlled so as to create a continuity between its one end and the other end. As a result, in the path switching circuit 230, the input portion In1 and output portion Out1 are controlled so as to have a continuity between them and the input portion In1 and output portion Out2 are controlled so as to have a continuity between them.

In contrast, when a low selection signal Sc is entered into the path switching circuit 230, the switch SW1 is controlled so as to create a continuity between its one end and the other end and the switch SW2 is controlled so as not to create a continuity between its one end and the other end. As a result, in the path switching circuit 230, the input portion In1 and output portion Out1 are controlled so as to have a continuity between them and the input portion In2 and output portion Out2 are controlled so as to have a continuity between them.

Specifically, the path switching circuit 230 has: the input portion In1 into which the driving signal COM is entered; the input portion In2 into which the constant-voltage signal VCNT is entered; the output portion Out1 that outputs the driving signal COM as the voltage signal V1; the output portion Out2 that outputs the driving signal COM or constant-voltage signal VCNT as the voltage signal V2; the switch SW1, one end of which is coupled to the input portion In2 and the other end of which is coupled to the output portion Out2; and the switch SW2, one end of which is coupled to the output portion Out1 and the other end of which is coupled to the output portion Out2. When a high selection signal Sc is entered from the selection control circuit 210, the switch SW1 is controlled so as not to create a continuity between its one end and the other end and the switch SW2 is controlled so as to create a continuity between its one end and the other end.

Therefore, the driving signal COM entered into the input portion In1 is output from the output portion Out1 as the voltage signal V1, and the driving signal COM entered into the input portion In1 is also output from the output portion Out2 as the voltage signal V2. When a low selection signal Sc is entered from the selection control circuit 210, the switch SW1 is controlled so as to create a continuity between its one end and the other end and the switch SW2 is controlled so as not to create a continuity between its one end and the other end. Therefore, the driving signal COM entered into the input portion In1 is output from the output portion Out1 as the voltage signal V1, and the constant-voltage signal VCNT entered into the input portion In2 is output from the output portion Out2 as the voltage signal V2.

In other words, in an operation mode in which the path switching circuit 230 outputs the driving signal COM from the output portion Out2, the selection control circuit 210 controls the switch SW1 so as not to create a continuity and also controls the switch SW2 so as to create a continuity. In another operation mode in which the path switching circuit 230 outputs the constant-voltage signal VCNT from the output portion Out2, the selection control circuit 210 controls the switch SW1 so as to create a continuity and also controls the switch SW2 so as not to create a continuity. That is, the selection control circuit 210 controls the switch SW1 and switch SW2. The switches SW1 and SW2 of this type can be structured with one or a plurality of transistors.

Referring again to FIG. 7, the voltage signal V1 output from the output portion Out1 of the path switching circuit 230 propagates through wiring W1 and enters the selection circuits TGa[1] to TGa[M]. The selection signals S output from the decoders DCa[1] to DCa[M] are also respectively entered into the selection circuits TGa[1] to TGa[M]. Each of the selection circuits TGa[1] to TGa[M] controls whether to supply the voltage signal V1 to the relevant piezoelectric element 60*a* as the driving signal VOUTa, according to the logic level of the selection signal S. That is, the wiring W1 electrically couples the output portion Out1 and piezoelectric elements 60*a* through the selection circuits TGa[1] to TGa[M].

Similarly, the voltage signal V2 output from the output portion Out2 of the path switching circuit 230 propagates through wiring W2 and enters the selection circuits TGb[1] to TGb[M]. The selection signals S output from the decoders DCb[1] to DCb[M] are also respectively entered into the selection circuits TGb[1] to TGb[M]. Each of the selection circuits TGb[1] to TGb[M] controls whether to supply the voltage signal V2 to the relevant piezoelectric element 60*b* as the driving signal VOUTb, according to the logic level of the selection signal S. That is, the wiring W2 electrically couples the output portion Out2 and piezoelectric elements 60*b* through the selection circuits TGb[1] to TGb[M].

Now, an example of the structure of the selection circuit TG will be described. FIG. 11 illustrates an example of the structure of the selection circuit TG. In FIG. 11, the selection circuit TGa into which the voltage signal V1 is entered is exemplified, and signals involved in the structure of the selection circuit TGb into which the voltage signal V2 is entered are indicated together by being parenthesized.

As illustrated in FIG. 11, the selection circuit TG includes an inverter 232, which is a NOT circuit, and a transfer gate 234. The selection signal S is entered into the positive control terminal of the transfer gate 234, the positive control terminal not being marked with a circle. In addition, the logic of the selection signal S is inverted by the inverter 232 and the inverted signal is entered into the negative control terminal of the transfer gate 234, the negative control terminal being marked with a circle. The voltage signal V1 is supplied to the input terminal of the transfer gate 234. The driving signal VOUTa is output from the output terminal of the transfer gate 234.

Specifically, when the selection signal S is high, a continuity is created between the input terminal and output terminal of the transfer gate 234. When the selection signal S is low, a continuity is not created between the input terminal and output terminal of the transfer gate 234. That is, the selection circuit TG switches the continuity state between the input terminal and output terminal of the transfer gate 234 according to the logic level of the selection signal S to select or not to select the voltage signal V1 to be supplied to the input terminal of the transfer gate 234. Thus, the driving signal VOUTa created as a result of the voltage signal V1 being selected or not being selected is output from the output terminal of the transfer gate 234.

As described above, the decoder DCa[i] and decoder DCb[i], which correspond to the discharging section 600[i], output selection signals S having the same logic level. Therefore, when the selection circuit TGa[i] outputs the voltage signal V1 as the driving signal VOUTa, the selection circuit TGb[i] outputs the voltage signal V2 as the driving signal VOUTa; and when the selection circuit TGa[i] does not output the voltage signal V1 as the driving signal VOUTa, the selection circuit TGb[i] does not output the voltage signal V2 as the driving signal VOUTa. That is, the selection control circuit 210 controls the selection circuit TGa and selection circuit TGb according to the same print data SId.

Now, a relationship will be described among the driving signals VOUTa and VOUTb output from the driving signal selection circuit 200, print data SId in the print data signal SI included in the discharge control signal DI entered into the driving signal selection circuit 200, and output selection data SOd in the output selection control signal SO.

Figure 12:
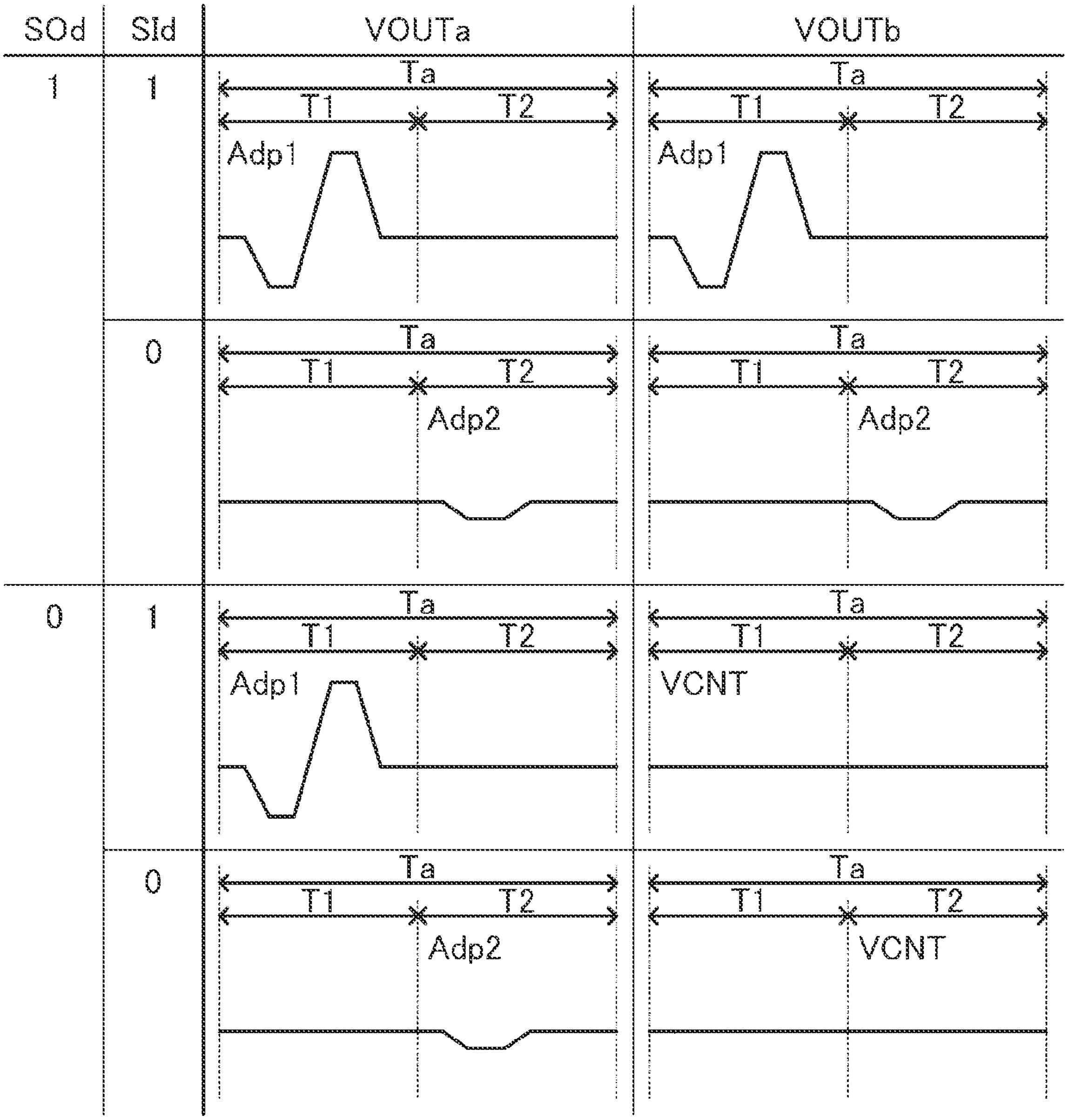
FIG. 12 illustrates an example of a relationship among driving signals, print data, and output selection data.

FIG. 12 illustrates an example of a relationship among the driving signals VOUTa and VOUTb, print data SId, and output selection data SOd.

When the discharge control signal DI entered into the driving signal selection circuit 200 includes output selection data SOd with a value of 1, the path switching circuit 230 outputs the driving signal COM as the voltage signals V1 and V2. Therefore, the selection circuit TGa corresponding to the discharging section 600 receives a supply of the driving signal COM as the voltage signal V1, and the selection circuit TGb corresponding to the discharging section 600 receives a supply of the driving signal COM as the voltage signal V2.

In this case, when the discharge control signal DI entered into the driving signal selection circuit 200 includes print data SId, corresponding to the discharging section 600, with a value of 1, the selection circuit TGa corresponding to the discharging section 600 selects the trapezoidal waveform Adp1 in the period T1 and does not select the trapezoidal waveform Adp2 in the period T2 and the selection circuit TGb corresponding to the discharging section 600 selects the trapezoidal waveform Adp1 in the period T1 and does not select the trapezoidal waveform Adp2 in the period T2. As a result, in the discharging section 600, the piezoelectric element 60*a* receives a supply of the driving signal VOUTa including the trapezoidal waveform Adp1 in the cycle Ta and the piezoelectric element 60*b* receives a supply of the driving signal VOUTb including the trapezoidal waveform Adp1 in the cycle Ta. That is, in the cycle Ta, the piezoelectric element 60*a* and piezoelectric element 60*b* included in the discharging section 600 are driven so as to discharge ink from the nozzle N. Thus, even when ink held in the pressure chambers CB1 and CB2 are highly viscous, ink can be stably discharged.

As described above, when the discharge control signal DI entered into the driving signal selection circuit 200 includes output selection data SOd with a value of 1, the path switching circuit 230 outputs the driving signal COM as the voltage signals V1 and V2. Therefore, the selection circuit TGa corresponding to the discharging section 600 receives a supply of the driving signal COM as the voltage signal V1, and the selection circuit TGb corresponding to the discharging section 600 receives a supply of the driving signal COM as the voltage signal V2.

In this case, when the discharge control signal DI entered into the driving signal selection circuit 200 includes print data SId, corresponding to the discharging section 600, with a value of 0, the selection circuit TGa corresponding to the discharging section 600 does not select the trapezoidal waveform Adp1 in the period T1 and selects the trapezoidal waveform Adp2 in the period T2 and the selection circuit TGb corresponding to the discharging section 600 does not select the trapezoidal waveform Adp1 in the period T1 and selects the trapezoidal waveform Adp2 in the period T2. As a result, in the discharging section 600, the piezoelectric element 60*a* receives a supply of the driving signal VOUTa including the trapezoidal waveform Adp2 in the cycle Ta and the piezoelectric element 60*b* receives a supply of the driving signal VOUTb including the trapezoidal waveform Adp2 in the cycle Ta. That is, in the cycle Ta, the piezoelectric element 60*a* and piezoelectric element 60*b* included in the discharging section 600 execute micro-vibration. Thus, ink held in the pressure chambers CB1 and CB2 becomes more viscous, reducing the fear that ink adheres to the vicinity of the nozzle N.

When the discharge control signal DI entered into the driving signal selection circuit 200 includes output selection data SOd with a value of 0, the path switching circuit 230 outputs the driving signal COM as the voltage signal V1 and also outputs the constant-voltage signal VCNT as the voltage signal V2. Therefore, the selection circuit TGa corresponding to the discharging section 600 receives a supply of the driving signal COM as the voltage signal V1, and the selection circuit TGb corresponding to the discharging section 600 receives a supply of the constant-voltage signal VCNT as the voltage signal V2.

In this case, when the discharge control signal DI entered into the driving signal selection circuit 200 includes print data SId, corresponding to the discharging section 600, with a value of 1, the selection circuit TGa corresponding to the discharging section 600 selects the trapezoidal waveform Adp1 in the period T1 and does not select the trapezoidal waveform Adp2 in the period T2 and the selection circuit TGb corresponding to the discharging section 600 selects the constant-voltage signal VCNT in the period T1 and does not select the constant-voltage signal VCNT in the period T2. As a result, in the discharging section 600, the piezoelectric element 60*a* receives a supply of the driving signal VOUTa including the trapezoidal waveform Adp1 in the cycle Ta and the piezoelectric element 60*b* receives a supply of the driving signal VOUTb, which is created in response to the constant-voltage signal VCNT, in the cycle Ta. That is, in the cycle Ta, the piezoelectric element 60*a* included in the discharging section 600 is driven so as to discharge ink from the nozzle N, and the piezoelectric element 60*b* included in the discharging section 600 remains with a certain displacement and is not driven. Thus, even when ink held in the pressure chambers CB1 and CB2 is softened due to, for example, the ambient temperature, ink can be stably discharged.

As described above, when the discharge control signal DI entered into the driving signal selection circuit 200 includes output selection data SOd with a value of 0, the path switching circuit 230 outputs the driving signal COM as the voltage signal V1 and also outputs the constant-voltage signal VCNT as the voltage signal V2. Therefore, the selection circuit TGa corresponding to the discharging section 600 receives a supply of the driving signal COM as the voltage signal V1, and the selection circuit TGb corresponding to the discharging section 600 receives a supply of the constant-voltage signal VCNT as the voltage signal V2.

In this case, when the discharge control signal DI entered into the driving signal selection circuit 200 includes print data SId, corresponding to the discharging section 600, with a value of 0, the selection circuit TGa corresponding to the discharging section 600 does not select the trapezoidal waveform Adp1 in the period T1 and selects the trapezoidal waveform Adp2 in the period T2 and the selection circuit TGb corresponding to the discharging section 600 does not select the constant-voltage signal VCNT in the period T1 and selects the constant-voltage signal VCNT in the period T2. As a result, in the discharging section 600, the piezoelectric element 60*a* receives a supply of the driving signal VOUTa including the trapezoidal waveform Adp2 in the cycle Ta and the piezoelectric element 60*b* receives the driving signal VOUTb, which is created in response to the constant-voltage signal VCNT, in the cycle Ta. That is, in the cycle Ta, the piezoelectric element 60*a* included in the discharging section 600 executes micro-vibration, and the piezoelectric element 60*b* included in the discharging section 600 remains with a certain displacement and is not driven. Thus, even when ink held in the pressure chambers CB1 and CB2 is softened due to, for example, the ambient temperature, the fear is reduced that ink is discharged due to micro-vibration.

When the selection circuit TGa does not select the voltage signal V1, the voltage supplied to the piezoelectric element 60 last is held by the piezoelectric element 60*a*. Specifically, the voltage Vc is held by the capacitive component of the piezoelectric element 60*a*. When the selection circuit TGb does not select the voltage signal V2, the voltage supplied to the piezoelectric element 60 last is held by the piezoelectric element 60*b*. Specifically the voltage Vc is held by the capacitive component of the piezoelectric element 60*b*.

Therefore, the voltage of the constant-voltage signal VCNT is preferably the voltage Vc. Thus, when whether to supply the constant-voltage signal VCNT to the piezoelectric elements 60*a* and 60*b* is controlled by the operations of the selection circuits TGa and TGb, the fear is reduced that the piezoelectric elements 60*a* and 60*b* are unintentionally driven due to a variation in the voltage supplied to the piezoelectric elements 60*a* and 60*b*. That is, the voltage of the constant-voltage signal VCNT preferably matches the voltage at the time of the occurrence of a rising edge of the latch signal LAT, which determines a cycle during which the driving signal COM is supplied to the piezoelectric elements 60*a* and 60*b*. Specifically, the voltage of the constant-voltage signal VCNT preferably matches the voltage Vc, which is the voltage of the driving signal COM at the time of the occurrence of a rising edge, of the latch signal LAT, equivalent to the start point of a cycle during which the driving signal COM is supplied.

Thus, even when the continuity state of the selection circuit TGb is switched while the path switching circuit 230 outputs the constant-voltage signal VCNT as the voltage signal V2, the fear is reduced that the output voltage of the driving signal VOUTb is unintentionally distorted. This reduces the fear that the piezoelectric element 60*b* is unintentionally displaced.

In the liquid discharging apparatus 1 as described above, the output selection data SOd included in the output selection control signal SO, which switches the operation of the path switching circuit 230, may be selected by the control circuit 100 according to the ink temperature detected by a temperature detection circuit (not illustrated), and may be output as the output selection control signal SO. Alternatively, output selection data SOd may be selected by the control circuit 100 according the ink discharge state detected by a discharge state detection circuit (not illustrated) and may be output as the output selection control signal SO. In addition, output selection data SOd may be selected in response to a manipulation of the user.

The piezoelectric element 60*a* is an example of a first piezoelectric element, and the piezoelectric element 60*b* is an example of a second piezoelectric element. The driving signal COM is an example of a driving signal. Since the driving signals VOUTa and VOUTb are created according to whether the signal waveform of the driving signal COM is selected or not selected, the driving signals VOUTa and VOUTb are each also an example of a driving signal. With the path switching circuit 230, the input portion In1 is an example of a first input portion; the input portion In2 is an example of a second input portion; the output portion Out1 is an example of a first output portion; the output portion Out2 is an example of a second output portion; the switch SW1 is an example of a first switch; and the switch SW2 is an example of a second switch. The selection control circuit 210 is an example of a switch control circuit. The wiring W1 is an example of first wiring, and wiring W2 is an example of second wiring. The operation mode in which the path switching circuit 230 outputs the driving signal COM as the voltage signal V2 is an example of a first mode, and the operation mode in which the path switching circuit 230 outputs the constant-voltage signal VCNT as the voltage signal V2 is an example of a second mode. The selection circuit TGa is an example of a third switch, and the selection circuit TGb is an example of a fourth switch. Print data SId in the print data signal SI included in the discharge control signal DI is an example of driving data. The latch signal LAT is an example of a cycle signal. The cycle Ta determined by the latch signal LAT is an example of a supply cycle. The control circuit 100, which outputs the latch signal LAT, is an example of a cycle control circuit. The pressure chamber CB1 is an example of a first pressure chamber, and the pressure chamber CB2 is an example of a second pressure chamber.

4. Effects

With the liquid discharging apparatus 1 structured as described above, when the selection control circuit 210 controls the switch SW1 in the path switching circuit 230 so that the switch SW1 does not create a continuity and also controls the switch SW2 in the path switching circuit 230 so that the switch SW2 creates a continuity and an operation mode is thereby entered in which the driving signal COM is output from the output portion Out2 of the path switching circuit 230, the piezoelectric element 60*a* receives a supply of the driving signal COM through the selection circuit TGa and the piezoelectric element 60*b* receives a supply of the driving signal COM through the selection circuit TGb. Thus, both the piezoelectric elements 60*a* and 60*b* are driven according to the driving signal COM. This makes it possible to add a large driving force to the discharging section 600. Even when highly viscous ink is used, therefore, ink can be stably discharged. In contrast, when the selection control circuit 210 controls the switch SW1 in the path switching circuit 230 so that the switch SW1 creates a continuity and also controls the switch SW2 in the path switching circuit 230 so that the switch SW2 does not create a continuity and an operation mode is thereby entered in which the constant-voltage signal VCNT is output from the output portion Out2 of the path switching circuit 230, the piezoelectric element 60*a* receives a supply of the driving signal COM through the selection circuit TGa and the piezoelectric element 60*b* receives a supply of the constant-voltage signal VCNT through the selection circuit TGb. Thus, the piezoelectric element 60*a* is driven according to the driving signal COM, and the piezoelectric element 60*b* is held with a certain displacement according to the constant-voltage signal VCNT. This makes it possible to reduce a driving force to be added to the discharging section 600. Even when the viscosity of ink changes, therefore, ink can be stably discharged.

That is, with the liquid discharging apparatus 1 in this embodiment, it is possible to reduce electric power consumed by a heater or another mechanism that adjusts the viscosity of ink. Furthermore, even when the liquid discharging apparatus 1 requires a large driving force because, for example, the liquid discharging apparatus 1 uses highly viscous ink, ink can be stably discharged.

So far, an embodiment has been described. However, the present disclosure is not limited to the embodiment. The present disclosure can be practiced in various aspects without departing from the intended scope of the present disclosure. For example, the above embodiment can be appropriately combined.

The present disclosure includes substantially the same structure as the structure described in the embodiment, the same structure being, for example, a structure having the same function, method, and result or having the same object and effects as described in the embodiment. The present disclosure also includes a structure in which a portion that is not essential to the structure described in the embodiment is replaced. The present disclosure also includes a structure that has the same effects as the effects of the structure described in the embodiment or a structure that can achieve the same object as the object of the structure described in the embodiment. The present disclosure also includes a structure in which a known technology is added to the structure described in the embodiment.

The following can be derived from the embodiment described above.

A liquid discharging apparatus according to an aspect has:

a discharging section including a first piezoelectric element and a second piezoelectric element, the discharging section discharging a liquid when at least one of the first piezoelectric element and the second piezoelectric element is driven;

a driving signal output circuit that outputs a driving signal that drives at least one of the first piezoelectric element and the second piezoelectric element;

a constant-voltage output circuit that outputs a constant-voltage signal, the voltage value of which is constant;

a path switching circuit having a first input portion into which the driving signal is entered, a second input portion into which the constant-voltage signal is entered, a first output portion that outputs the driving signal, a second output portion that outputs the driving signal or the constant-voltage signal, a first switch, one end of which is coupled to the second input portion and the other end of which is coupled to the second output portion, and a second switch, one end of which is coupled to the first output portion and the other end of which is coupled to the second output portion;

first wiring through which the first output portion and the first piezoelectric element are electrically coupled together;

second wiring through which the second output portion and the second piezoelectric element are electrically coupled together; and a switch control circuit that controls the first switch and the second switch.

In a first mode in which the driving signal is output from the second output portion, the switch control circuit controls the first switch so as not to create a continuity and controls the second switch so as to create a continuity.

In a second mode in which the constant-voltage signal is output from the second output portion, the switch control circuit controls the first switch so as to create a continuity and controls the second switch so as not to create a continuity.

With this liquid discharging apparatus, in the first mode in which the driving signal is output from the second output portion, the switch control circuit controls the first switch so as not to create a continuity and controls the second switch so as to create a continuity; and in the second mode in which the constant-voltage signal is output from the second output portion, the switch control circuit controls the first switch so as to create a continuity and controls the second switch so as not to create a continuity. Therefore, a state under which the first piezoelectric element and the second piezoelectric element are driven can be changed according to the viscosity of the liquid. This makes it possible to stably discharge a liquid and to reduce power consumption.

In another aspect of the liquid discharging apparatus, the first wiring may be electrically coupled to the first piezoelectric element through a third switch;

the second wiring may be electrically coupled to the second piezoelectric element through a fourth switch; and the third switch and the fourth switch may be controlled by the switch control circuit.

With this liquid discharging apparatus, the switch control circuit, which is a common circuit, controls the first switch and second switch, which are included in the path switching circuit, the third switch that switches electric coupling between the first output portion and the first piezoelectric element, and the fourth switch that switches electric coupling between the second output portion and the second piezoelectric element. Therefore, controls signals used to control the first switch, second switch, third switch, and fourth switch can be transferred in batch as a single signal.

In another aspect of the liquid discharging apparatus, the switch control circuit may control the third switch and the fourth switch according to driving data.

With this liquid discharging apparatus, the third switch and the fourth switch are controlled according to the same driving data. Therefore, the amount of driving data used to drive the third switch and fourth switch can be reduced.

In another aspect of the liquid discharging apparatus, a cycle control circuit may be provided that outputs a cycle signal that determines a supply cycle during which the driving signal is supplied to at least one of the first piezoelectric element and the second piezoelectric element. The voltage value of the constant voltage signal may be equal to the voltage value of the driving signal at the start point of the supply cycle.

With this liquid discharging apparatus, when a switchover is made from the first mode to the second mode and when a switchover is made from the second mode to the first mode, the fear is reduced that the first piezoelectric element or second piezoelectric element is unintentionally displaced.

In another aspect of the liquid discharging apparatus, the discharging section may include a first pressure chamber in which internal pressure changes when the first piezoelectric element is driven, a second pressure chamber in which internal pressure changes when the second piezoelectric element is driven, and a nozzle that communicates with the first pressure chamber and the second pressure chamber and discharges the liquid.

With this liquid discharging apparatus, the liquid supplied to the discharging section can be circuited. Therefore, the viscosity of the liquid can be more finely adjusted.

What is claimed is:

1. A liquid discharging apparatus comprising:

a discharging section including a first piezoelectric element and a second piezoelectric element, the discharging section discharging a liquid when at least one of the first piezoelectric element and the second piezoelectric element is driven;

a driving signal output circuit that outputs a driving signal that drives at least one of the first piezoelectric element and the second piezoelectric element;

a constant-voltage output circuit that outputs a constant-voltage signal, a voltage value of which is constant;

a path switching circuit having a first input portion into which the driving signal is entered, a second input portion into which the constant-voltage signal is entered, a first output portion that outputs the driving signal, a second output portion that outputs the driving signal or the constant-voltage signal, a first switch, one end of which is coupled to the second input portion and another end of which is coupled to the second output portion, and a second switch, one end of which is coupled to the first output portion and another end of which is coupled to the second output portion;

first wiring through which the first output portion and the first piezoelectric element are electrically coupled together;

second wiring through which the second output portion and the second piezoelectric element are electrically coupled together; and a switch control circuit that controls the first switch and the second switch; wherein in a first mode in which the driving signal is output from the second output portion, the switch control circuit controls the first switch so as not to create a continuity and controls the second switch so as to create a continuity, and in a second mode in which the constant-voltage signal is output from the second output portion, the switch control circuit controls the first switch so as to create a continuity and controls the second switch so as not to create a continuity.

2. The liquid discharging apparatus according to claim 1, wherein:

the first wiring is electrically coupled to the first piezoelectric element through a third switch;

the second wiring is electrically coupled to the second piezoelectric element through a fourth switch; and the third switch and the fourth switch are controlled by the switch control circuit.

3. The liquid discharging apparatus according to claim 2, wherein the switch control circuit controls the third switch and the fourth switch according to driving data.

4. The liquid discharging apparatus according to claim 1, further comprising a cycle control circuit that outputs a cycle signal that determines a supply cycle during which the driving signal is supplied to at least one of the first piezoelectric element and the second piezoelectric element, wherein the voltage value of the constant voltage signal is equal to a voltage value of the driving signal at a start point of the supply cycle.

5. The liquid discharging apparatus according to claim 1, wherein the discharging section includes a first pressure chamber in which internal pressure changes when the first piezoelectric element is driven, a second pressure chamber in which internal pressure changes when the second piezoelectric element is driven, and a nozzle that communicates with the first pressure chamber and the second pressure chamber and discharges the liquid.

* * * * *